Oct. 3, 1944.　　　　A. F. TURNER　　　　2,359,694

OPTICAL INSTRUMENT

Original Filed Feb. 22, 1943

ARTHUR F. TURNER
INVENTOR.

BY

ATTORNEYS

Patented Oct. 3, 1944

2,359,694

UNITED STATES PATENT OFFICE 2,359,694

OPTICAL INSTRUMENT

Arthur F. Turner, Brighton, N. Y., assignor to Bausch & Lomb Optical Company, Rochester, N. Y., a corporation of New York Original application February 22, 1943, Serial No. 476,675. Divided and this application May 31, 1943, Serial No. 489,161

6 Claims. (Cl. 88—39)

This invention relates to optical instruments and more particularly to a microscope employing polarized light.

It is known that total internal reflection of plane polarized light introduces a phase shift between the electric vector vibrations in the plane of incidence and those in the plane perpendicular thereto. Such a phase shift which so alters polarized light is frequently undesirable in many optical systems, particularly systems employing analyzing means. Hence only in special cases and with special precautions can a total reflecting surface be used in an optical system in which polarized light is used.

I have shown and described in my copending application Serial No. 476,675 filed February 22, 1943, means for selectively controlling the phase shift created when polarized light of any description is reflected, and the present application is a division of the application just identified.

Polarizing microscopes which are used for determining and measuring the optical characteristics of opaque or nearly opaque anisotropic substances have heretofore been provided with an illuminating system in which the polarizing element is interposed between the light source and a deflecting prism. In such systems the polarized light beam does not emerge from the deflecting prism homogeneously polarized because the reflection by the prism disturbs the polarization conditions. Consequently, it is impossible to depend upon the result of researches or observations conducted with such prior systems or arrangements.

To obviate the difficulties experienced in such prior microscopes, it was proposed to employ specially constructed deflecting prisms which did not affect the state of polarization of the polarized light incident on the reflecting surface of the prism. Such prisms are relatively expensive and require great care in making, and render instruments employing the same quite costly.

It has also been prosposed to mount the polarizing element between the deflecting prism and the objective of the microscope. This proposal, although it eliminated the cost of the specially formed prism, was not satisfactory, for the polarizing element to avoid vignetting had to be plate-like in form and it is difficult to secure an efficient polarizing element in such form. These elements have generally been located in the rear pupil of the objectives and it has been difficult to adjust the position of the same.

The difficulties found in the prior instruments are avoided by the instrument of the present invention, for the polarizing element is interposed between the light source and the deflecting prism and is therefore accessible. The phase shift, due to reflection of the light by the reflecting surface of the prism, is selectively controlled by an interference film formed on the reflecting surface of the prism.

The phase shift for a given combination of materials is controlled by the thickness of the film, as well as the wavelength of light, and the angle of incidence of the same on the reflecting surface. Thus, it is possible to obtain within relatively wide limits, any phase shift desired by carefully selecting the material of the prism, as well as the material of the film, and the thickness of the latter. The ability of the reflecting element of the device of the present invention to alter or modify the phase shift of polarized light when reflected can therefore be used for varying the phase shift introduced into plane polarized light when the same is totally reflected in light polarizing systems such as herein disclosed for use with microscopes for viewing objects by incident light.

The film should be substantially isotropic and formed of a homogeneous, transparent and non-metallic substance having an index of refraction different from that of the material of the prism. Films which cause interference of light are extremely thin and, as understood by the art when referring to an interference film, I mean a film having a geometrical thickness which is of the order of the magnitude of a wavelength of light.

Other features and objects of the present invention will be apparent from the following description of the same taken in connection with the accompanying drawing in which.

Figures 2, 3:
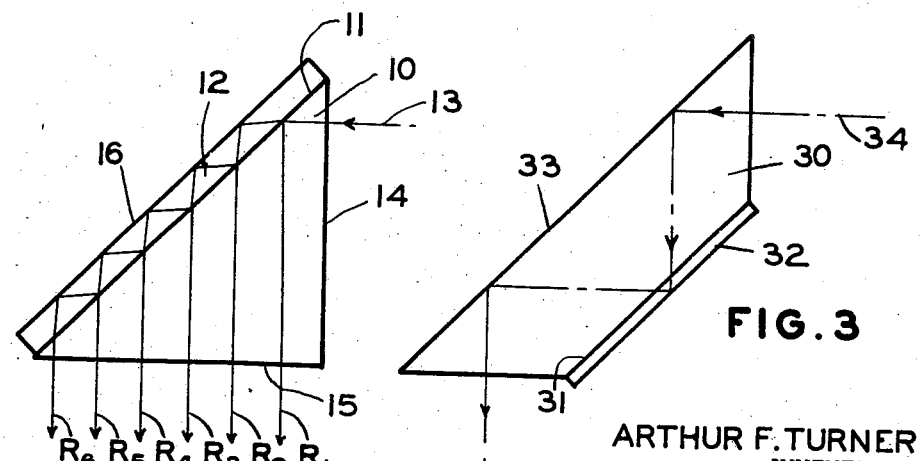
Fig. 2 is a schematic view of a right angle prism employed in the illumination system of the present invention showing the path of the light rays traced through the prism.
Fig. 3 is a schematic view of a modified form of the prism of the instrument of the present invention.

The now preferred embodiment of the deflecting prism 10 of the illuminator of the present invention, referring now to Fig. 2, is formed of a transparent material having a known index of refraction. The prism is a right angle isosceles prism and the hypotenuse surface 11 thereof, the reflecting surface of the prism in its use in the present invention, carries a thin interference film 12 of any suitable transparent material having a refractive index different from that of the material of the prism.

Fig. 2 illustrates the path of a ray of light 13 through the prism 10, the ray being perpendicular to the face 14, shown as the entrance face. When ray 13 strikes the hypotenuse surface 11, a portion of the ray is reflected and another portion is transmitted through the prism-film interface into the film 12 since the total reflecting properties of the prism have been shifted from the hypotenuse face 11 to the film-air surface 16. The reflected portion of the ray is emitted through the exit face 15 and is shown as ray component R-1. On the other hand, the transmitted portion of the ray 13 proceeds through the film 12 to the film-air surface 16 where it is totally reflected in a direction substantially parallel to the ray component R-1.

At the prism-film surface this just-mentioned totally reflected portion of ray 13 is partially reflected and partially transmitted. The transmitted portion of the latter forms the ray component $R_2$, which is substantially parallel to $R_1$. At the second reflection at the prism-film surface, the part of the ray so reflected is directed back into the film 12. This process proceeds ad infinitum until substantially all of the light energy of the ray 13 is transmitted out of the prism 10. The series of multiple reflections give rise to a series of components of the ray 13, those occurring after the ray component $R_2$ being indicated by ray components $R_3$ to $R_6$. While, as noted, the multiple reflections proceed ad infinitum and hence result in an infinite number of ray components, it should be kept in mind that Fig. 2 is for the purpose of diagrammatically illustrating the general effect of the prism and the interference film on light, and that only by grossly exaggerating the thickness of the film 12 is it possible to indicate even a few reflections and resulting ray components.

The prism 10 and its film 12 will cause both unpolarized and polarized light to be redirected in a manner like that just described. However, as heretofore noted, a shift in the phase of polarized light accompanies its reflection. The alteration in the phase shift originates in the interference of the ray components broken off from the parent ray 13 by reflection at the two surfaces of the film, as best illustrated in Fig. 2. Since the ray components $R_1$, $R_2$ etc. all arise from the parent ray, they are coherent and their phase displacements will add vectorially. The relative phases of the individual ray components will be altered both by reflection at the film surfaces and also by the retardation due to the thickness of the film.

The total phase shift for ray 13 depends on the reflectance of the prism-film surface, as well as on the phase shift due to the total reflection at the film-air surface and the geometrical thickness of the film. This makes it possible to selectively alter the phase shift which ordinarily occurs in reflected polarized light by suitably controlling the thickness and index of refraction of the interference film 12 which is formed on the total reflecting surface 11.

The theory underlying the alteration of phase shift for total reflection by means of a thin film is fully explained in my copending application above identified and no further explanation will be given here of the theoretical considerations involved.

In the now preferred embodiment of the vertical illuminator of the present invention, the prism 10 is mounted between the polarizing element and the specimen. The illuminator is particularly adaptable for the examination of opaque anisotropic specimens and comprises condenser lenses 18 which direct light from a source 19 through a polarizer 21. The plane polarized light emerging from the polarizer 21 is directed by lens 22 to the prism 10 which is shown with the interference film 12 on its hypotenuse face. The prism 10 totally reflects the light downwardly through one side of the objective lens system 23 and to the specimen 24. The light reflected from the specimen 24 ascends through the other side of the objective lens system 23 to the analyzer 25 from which analyzed light is passed to the eyepiece, not shown, of the microscope.

Figure 1:
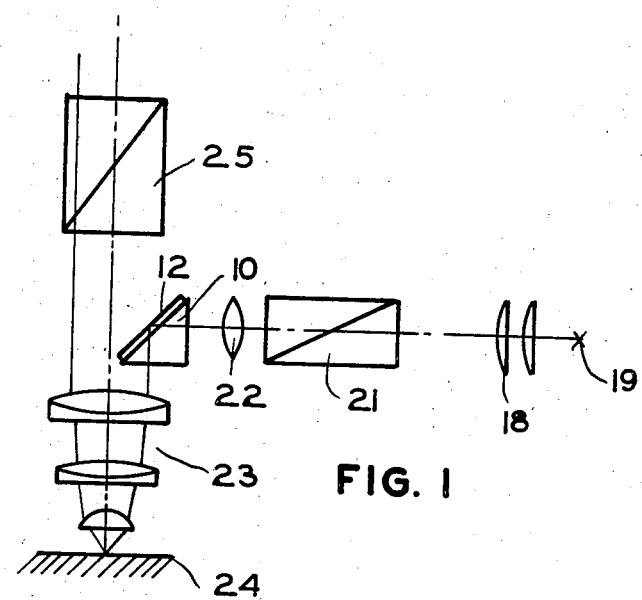
Fig. 1 is a schematic view of the vertical illumination system of the present invention.

If a right angle prism without a reflecting film on its hypotenuse face is employed in a system like that of Fig. 1, the phase displacement created by the reflected light makes it difficult to properly use the analyzer 25. When a prism without an interference film is used in such a semi-aperture type of system, it is necessary to orient the polarizer 21 with extreme precision with regard to the prism so that the vibration direction of the polarizer is parallel or perpendicular to a principal section of the prism. Otherwise the ellipticity introduced by the phase shift created by the total reflection would not allow the analyzer to give extinction. Even if the polarizer be oriented in this way, oblique rays will become elliptically polarized and only the center of the field can approach good extinction.

The phase shift can be controlled by the interference film and if the phase shift can be made 0° or 180° or 360°, the elliptical effect will be substantially eliminated when plane polarized light is reflected. However, at present, a phase shift of 180° is the only usable phase shift obtainable for eliminating the ellipticity. A phase shift of 180° can be obtained by forming the film of a material such as sodium aluminum fluoride having an index of refraction of 1.34 on the hypotenuse of a prism with a refractive index of 1.75. The thickness of the film should approximate ¾ wavelength measured at perpendicular incidence. It should be obvious now, however, that a shift of 180° could be obtained by using a prism and film of different refractive indices than the example given and changing the thickness of the film. In the case of effecting a phase shift of 180° by the employment of a reflecting film, the totally reflecting surface acts as a half-wave plate rotating the direction of polarization but not creating ellipticity.

In a system employing a right angle prism 10, the use of a phase shift of 180° as compared to 0° or 360° will reverse the directional sense of rotation given an analyzer located behind the right angle prism in following a given rotation of the polarizer 21. A clockwise rotation of the polarizer as seen by looking towards the light source can be followed by rotation of the analyzer in the same directional sense. The azimuthal rotation sense of vibration from the analyzer is reversed by the actual reflection and also by the half-wave or 180° phase shift. In the case of the vertical illuminator system shown in Fig. 1, the reflection at the surface of the specimen 24 again reverses the azimuthal rotation sense so that the tube analyzer 25 or a cap analyzer if used would have to be rotated counterclockwise to follow a clockwise rotation of the polarizer 21.

A phase shift of 360° can be obtained through the use of a deflecting prism 30 such as shown in Fig. 3. This prism can be said to comprise a right angle prism and a rhomb formed of the same transparent material. In the embodiment illustrated, the reflecting face 31 carries a thin film 32 while the reflecting face 33 is left unfilmed.

Fig. 3 schematically traces a ray 34 through the prism 30, the multiple reflections at the film 32 being omitted from the drawing for clarity. The end of entrance and exit faces 35 and 36, respectively, are inclined at 45° to the reflecting faces 31 and 33. The ray is normal to the entrance face 35, the direction of the ray being indicated by the arrows, and thus the angle of incidence of the ray at the face 33 is 45°.

It is known that the phase shift normally introduced into polarized light by material of index 1.52 when the light is incident to a totally reflecting surface at 45° equals 139° 45'. Assuming prism 30 to have a refractive index of 1.52, the two reflections at the totally reflecting and unfilmed surface 33 will cause two phase shifts, each equal to 139° 45', to be introduced into polarized light traversing the prism. Thus the total phase shift introduced by the two reflections will equal 279° 30'.

A phase shift also takes place at the filmed surface 31 and as the total phase shift desired is 360°, it is evident that the filmed surface should provide a phase shift of 80° 30'. Such a value can be obtained by coating the surface 31 with a film of zinc sulphide having an index of refraction of 2.3. The thickness of the film, when the material of the prism has a refractive index of 1.52, must be substantially either 0.12 or 0.25 wavelength measured at perpendicular incidence.

Other combinations of prisms and films will also give the phase shift desired and it could be obtained by filming both reflecting surfaces of the prism.

The reflection or interference film, as used in the present invention, is well understood by the art and may be formed by depositing a metallic substance or oxide on a desired surface by a high vacuum thermal evaporation process. While any suitable transparent substances may be used to form the evaporated film, substances which are non-absorbing as to light, such as sodium aluminum fluoride and zinc sulphide, are preferable but not essential.

While the present preferred embodiments of the invention have been illustrated and described herein, it is to be understood that the invention is not limited thereby but is susceptible of changes in form and detail within the spirit of the invention and the scope of the appended claims.

I claim:

1. A system for microscopic examination of anisotropic substances by incident polarized light in which the illuminating rays pass through the objective in a direction substantially normal to the plane of observation of the specimen, comprising a source of light; a microscope objective; a prism having an internal totally reflecting surface; an interference film of uniform thickness in optical contact with said reflecting surface, said film being formed of a material having an index of refraction less that of said prism and deflecting a light beam from said light source towards the objective in a direction substantially normal to the plane of observation of the specimen to illuminate the same; a polarizing element disposed between said prism and said source of light, the thickness of said film and index of refraction thereof being such relative to the index of refraction of said prism that the phase shift created by the reflection at the air-film surface of said polarized light is selectively modified so that the polarized light directed to said objective will remain homogeneously linearly polarized; and an analyzing element positioned in the path of said illuminating rays which are reflected by the specimen into the objective and passed through the latter to form an image of the object.

2. In an illuminating system of the type described, a light source; a polarizing element for polarizing light from said source; a prism in optical alignment with said element; a totally reflecting surface on said prism and so disposed as to direct polarized light to the specimen to be illuminated in a path substantially normal to the plane of observation of the specimen; an objective intermediate the prism and the specimen; an interference film of uniform thickness carried by the reflecting surface of said prism, said film comprising distilled transparent material having an index of refraction less than that of said prism so that the reflection of said light is shifted from the reflecting surface of said prism to the air-film surface, the index of refraction and the thickness of said film being such relative to the refractive index of said prism that the phase shift of said polarized light is selectively controlled by the reflection at the air-film surface and the state of polarization of the light directed to said objective is substantially the same as that incident on said surface; and an analyzing element positioned in the path of said illuminating rays which are reflected by the specimen into the objective and passed through the latter to form an image of the object.

3. A system for microscopic examination of anisotropic substances by incident polarized light in which the illuminating rays pass through the objective in a direction substantially normal to the plane of observation of the specimen, comprising a source of light; a microscope objective; means for deflecting a beam of light from said light source towards the objective in a direction substantially normal to the plane of observation of a specimen to illuminate the same, said deflecting means comprising a right angle prism having an index of refraction of 1.75 and a totally reflecting surface carrying an interference film having an index of refraction of 1.34 and a thickness of substantially three-quarters wavelength of light; a polarizing element disposed between said deflecting means and said source of light, the film controlling the phase shift of said polarized light at the reflection thereof by said film so that the state of polarization of the light emerging from said prism remains substantially the same as that of the light entering said prism; and an analyzing element positioned in the path of said illuminating rays which are reflected by the specimen into the objective and passed through the latter to form an image of the object.

4. A system for microscopic examination of anisotropic substances by incident polarized light in which the illuminating rays pass through the objective in a direction substantially normal to the plane of observation of the specimen, comprising a source of light; a microscope objective; means for deflecting a beam of light from said light source towards the objective in a direction substantially normal to the plane of observation of a specimen to illuminate the same; a polarizing element disposed between said deflecting means and said source of light for linearly polarizing light passed therethrough, said deflecting means comprising a prism having an index of refraction of 1.52, said prism having two totally reflecting surfaces, one of said surfaces carrying an interference film having an index of refraction of 2.3 and a thickness of substantially a quarter wavelength of light the film modifying by a predetermined extent the phase shift produced by the two reflections so that the polarized light directed to said objective will be homogeneously linearly polarized; and an analyzing element positioned in the path of said illuminating rays which are reflected by the specimen into the objective and passed through the latter to form an image of the object.

5. A system for microscopic examination of anisotropic substances by incident polarized light in which the illuminating rays pass through the object in a direction substantially normal to the plane of observation of the specimen comprising a source of light; a polarizing element; means for deflecting the light polarized by said element in a direction substantially normal to the path of the rays incident thereon, said deflecting means comprising a transparent element having an internal totally reflecting surface with a thin film of transparent material having an index of refraction different from that of said element carried by said surface so that the light emerges from said means without change in its state of polarization due to the retardation of the film and the deflection by said means; a microscope objective disposed in the path of said deflected rays; and an analyzing element positioned in the path of the rays of the polarized light which are reflected by the specimen into the objective and passed through the latter to form an image of the specimen.

6. A system for microscopic examination of anisotropic substances by incident polarized light in which the illuminating rays pass through the object in a direction substantially normal to the plane of observation of the specimen comprising a source of light; a microscope objective; a polarizing element disposed adjacent to said source of light and polarizing light emanating therefrom; a right angle prism having an internal totally reflecting surface with a thin film of transparent material carried thereby, said film having an index of refraction less than the index of refraction of said prism and selectively modifying the phase shift normally created by the totally reflecting surface of the prism so that the state of polarization of the light emerging from said prism is substantially that of the light entering said prism; and an analyzing element positioned in a path of said illuminating rays which are reflected by the specimen back into the objective and passed through the latter to form an image of the specimen.

ARTHUR F. TURNER.